US011255733B2

(12) United States Patent
Nakamura et al.

(10) Patent No.: US 11,255,733 B2
(45) Date of Patent: Feb. 22, 2022

(54) ENVIRONMENT SENSOR

(71) Applicant: OMRON Corporation, Kyoto (JP)

(72) Inventors: Kayo Nakamura, Shiga (JP);
Naotsugu Ueda, Shiga (JP); Ryusuke Sakai, Kyoto (JP); Hiroyuki Mino, Osaka (JP); Yuhei Motoki, Kyoto (JP);
Shuichi Misumi, Kyoto (JP)

(73) Assignee: Omron Corporation, Kyoto (JP)

( * ) Notice: Subject to any disclaimer, the term of this patent is extended or adjusted under 35 U.S.C. 154(b) by 503 days.

(21) Appl. No.: 16/165,300

(22) Filed: Oct. 19, 2018

(65) Prior Publication Data

US 2019/0145834 A1 May 16, 2019

(30) Foreign Application Priority Data

Nov. 10, 2017 (JP) .............................. JP2017-217497

(51) Int. Cl.
*G01K 15/00* (2006.01)
*G01K 1/20* (2006.01)
*G01K 7/16* (2006.01)

(52) U.S. Cl.
CPC ................ *G01K 1/20* (2013.01); *G01K 7/16* (2013.01); *G01K 15/005* (2013.01)

(58) Field of Classification Search
CPC .......... G01K 13/00; G01K 17/00; G01K 1/16; G01K 1/143; G01K 7/425; G01K 15/005;
(Continued)

(56) References Cited

U.S. PATENT DOCUMENTS 8,280,673 B2 * 10/2012 Aljabari ................ G01K 7/427
702/130
8,734,007 B2 * 5/2014 Campbell ................ G06F 1/20
374/1

(Continued)

FOREIGN PATENT DOCUMENTS

JP           H11-14468 A      1/1999
JP        2001092798 A   *   4/2001
(Continued)

OTHER PUBLICATIONS

Notice of Reasons for Refusal issued in Japanese Application No. 2017-217497, dated Mar. 23, 2021 (11 pages).

*Primary Examiner* — Gail Kaplan Verbitsky
(74) *Attorney, Agent, or Firm* — Osha Bergman Watanabe & Burton LLP

(57) ABSTRACT

An environment sensor includes a heat generation component, a first sensor and a second sensor disposed such that conductive heat resistances between the first sensor and the heat generation component and between the second sensor and the heat generation component are different from each other, and a controller. The first sensor and the second sensor are capable of measuring a predetermined physical quantity. The first sensor and the second sensor obtain a measured value from the predetermined physical quantity. The measured value fluctuates depending on ambient temperature. The controller is configured to correct the measurement value of one of the first sensor and the second sensor based on the measurement value of the first sensor and the measurement value of the second sensor when the predetermined physical quantity is measured.

9 Claims, 16 Drawing Sheets

(58) Field of Classification Search
CPC .... G01K 17/06; G01K 2003/145; G01K 7/00; G01K 15/002; G01K 2217/00; G01N 25/482; G01N 27/3274; G01N 25/4866; G01N 33/0031
USPC ....... 374/152, 137, 110, 112, 115, 29, 30, 1, 374/183, 109; 702/130, 99
See application file for complete search history.

(56) References Cited

U.S. PATENT DOCUMENTS

| | | | | |
|---|---|---|---|---|
| 9,557,228 | B1* | 1/2017 | Parvarandeh | G01K 7/427 |
| 9,966,783 | B2* | 5/2018 | Sacchetti | G01D 3/036 |
| 2008/0150929 | A1* | 6/2008 | Cho | G09G 3/2948 |
| | | | | 345/211 |
| 2009/0002279 | A1* | 1/2009 | Takeuchi | G09G 3/2946 |
| | | | | 345/63 |
| 2009/0190625 | A1* | 7/2009 | Chung | G06F 1/206 |
| | | | | 374/11 |
| 2010/0141563 | A1* | 6/2010 | Takeuchi | G09G 3/2946 |
| | | | | 345/63 |
| 2012/0192632 | A1 | 8/2012 | Matsumoto et al. | |
| 2013/0024145 | A1* | 1/2013 | Hull Roskos | G01K 13/00 |
| | | | | 702/65 |
| 2014/0140364 | A1* | 5/2014 | Charles | G01K 15/005 |
| | | | | 374/1 |
| 2015/0003491 | A1* | 1/2015 | Matsumoto | G01K 1/20 |
| | | | | 374/1 |
| 2015/0134123 | A1* | 5/2015 | Obinelo | F24F 11/30 |
| | | | | 700/277 |
| 2015/0276509 | A1 | 10/2015 | Carbone et al. | |
| 2016/0041845 | A1* | 2/2016 | Yoon | G06F 9/5094 |
| | | | | 718/105 |
| 2017/0234818 | A1* | 8/2017 | Jesme | H02J 50/20 |
| | | | | 374/54 |
| 2018/0003572 | A1* | 1/2018 | Garsd | G01K 3/14 |
| 2018/0046207 | A1* | 2/2018 | Wohlgethan | G05D 23/1934 |
| 2018/0136051 | A1* | 5/2018 | Ishii | G01K 1/20 |
| 2018/0251558 | A1* | 9/2018 | Maute | C07K 16/2833 |
| 2018/0270381 | A1* | 9/2018 | Ikuta | G06K 15/406 |

FOREIGN PATENT DOCUMENTS

| | | |
|---|---|---|
| JP | 2003-322569 A | 11/2003 |
| JP | 2012-159314 A | 8/2012 |
| JP | 2012-167972 A | 9/2012 |
| JP | 2015-10873 A | 1/2015 |
| JP | 6095360 B2 * | 3/2017 |

* cited by examiner

FIG. 1B
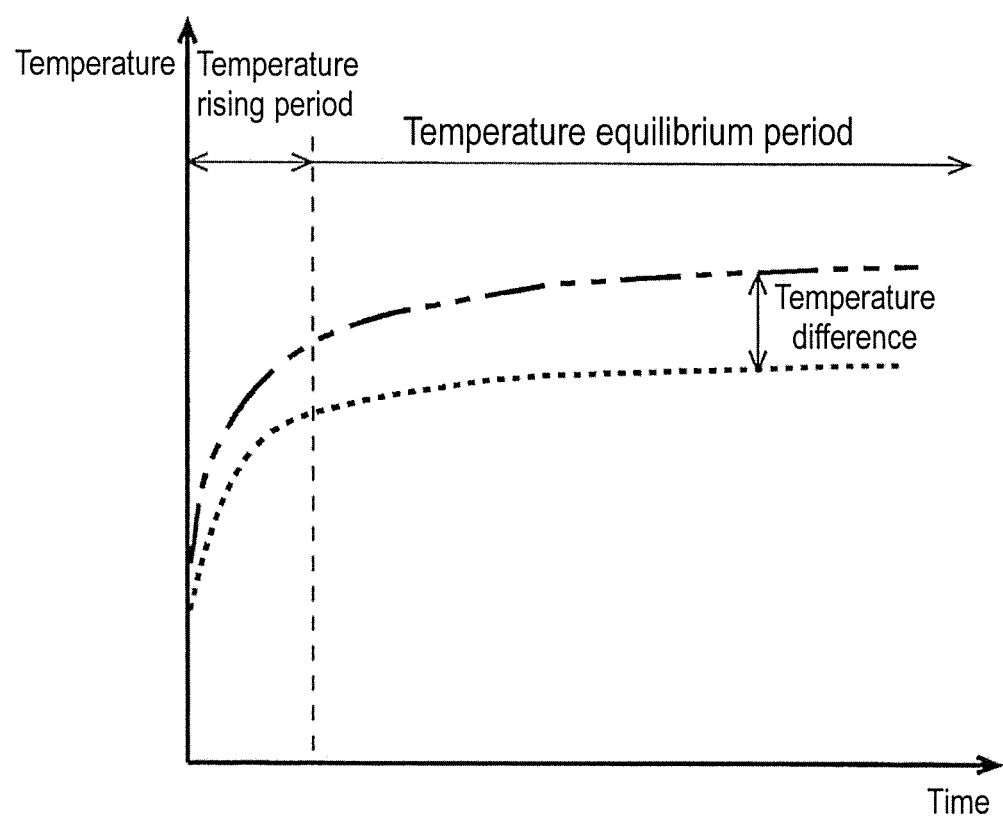
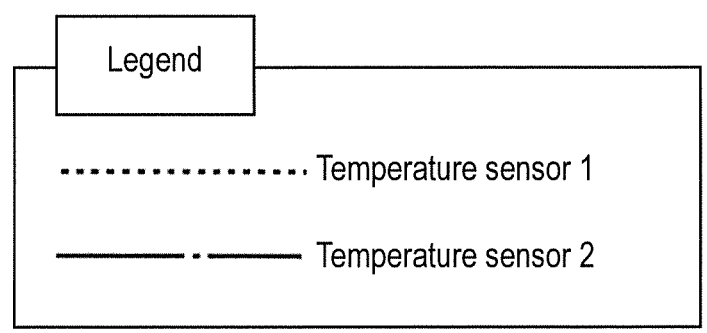

FIG. 1C
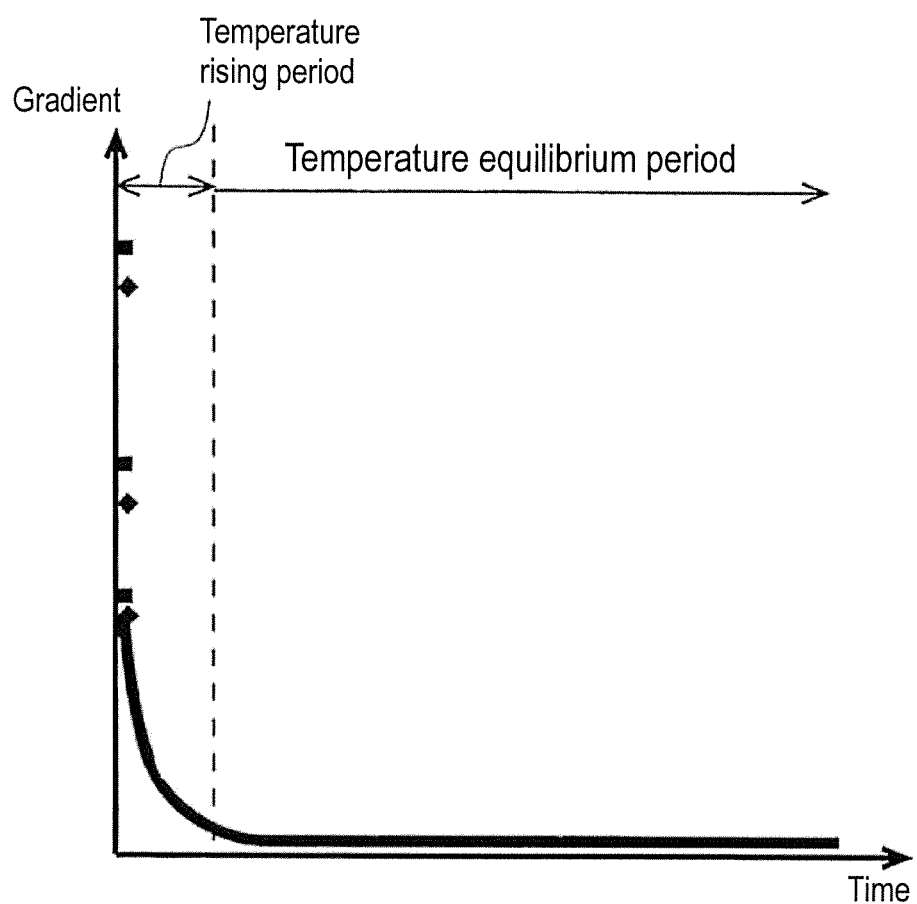
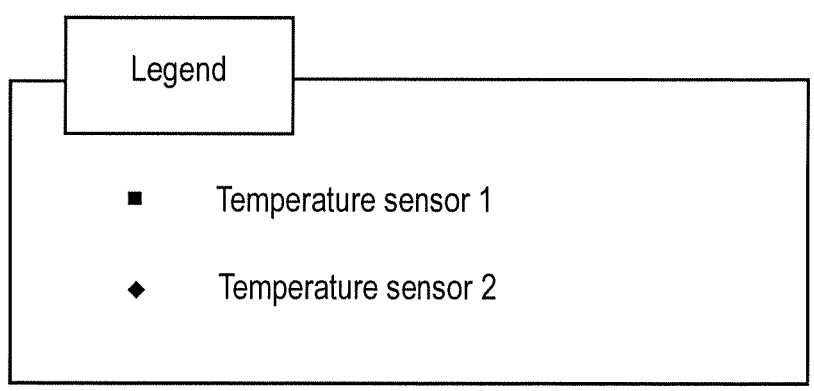

Difference between environmental temperature and temperature indicated by temperature and humidity sensor element Difference between environmental temperature and temperature indicated by atmospheric pressure sensor element Difference between temperature indicated by temperature and humidity sensor element and temperature indicated by atmospheric pressure sensor element in the case that environmental temperature is changed

ENVIRONMENT SENSOR

CROSS-REFERENCE TO RELATED APPLICATION

This application is based on Japanese Patent Application No. 2017-217497 filed with the Japan Patent Office on Nov. 10, 2017, the entire contents of which are incorporated herein by reference.

FIELD

The present invention relates to an environment sensor capable of measuring a physical quantity of a surrounding environment.

BACKGROUND

In recent years, compact, low-power consumption sensor elements in which a technology of micro electro mechanical systems (MEMS) is used have drawn attention, and miniaturization of a temperature sensor is developed using the MEMS.

For example, in Japanese Unexamined Patent Application Publication No. 2003-322569, there is proposed a temperature sensor in which, by providing a temperature sensor element and a transmission circuit that transmits a measurement result of the temperature sensor element on substrate surfaces opposed to each other, heat received from the transmission circuit by the temperature sensor element is decreased to suppress degradation of measurement accuracy of the temperature sensor element.

In the environment sensor, a transmission element that transmits the measurement result measured by the environment sensor element to an external device and an arithmetic element that performs a predetermined arithmetic on the measurement result are provided in addition to various sensor elements that measure various physical quantities such as temperature, light, and sound. Some elements provided in the environment sensor also include a heat generation component that generates the heat by operation. Some sensor elements have temperature dependence that a measurement value fluctuates due to the heat received from surroundings. The measurement accuracy of the sensor element in which the measurement value fluctuates due to the heat received from the surroundings may be decreased due to heat generation of a heat generation component. Due to miniaturization of the environment sensor in recent years, the degradation of the measurement accuracy of the sensor element can hardly be suppressed by increasing a conductive heat resistance between the sensor element with temperature dependence and the heat generation component.

SUMMARY

One aspect of the disclosed technique is to provide an environment sensor capable of suppressing the degradation of the measurement accuracy due to the heat of the heat generation component even if the sensor element has the temperature dependence.

One aspect of the disclosed technique is exemplified by the following environment sensor. An environment sensor includes: a heat generation component; a first sensor and a second sensor that are disposed such that conductive heat resistances between the first sensor and the heat generation component and between the second sensor and the heat generation component are different from each other, the first sensor and the second sensor being capable of measuring a predetermined physical quantity, the first sensor and the second sensor obtaining a measured value from the predetermined physical quantity, the measured value fluctuating depending ambient temperature; and a controller configured to correct the measurement value of one of the first sensor and the second sensor based on the measurement value of the first sensor and the measurement value of the second sensor when the predetermined physical quantity is measured.

According to this technique, the first sensor and the second sensor are disposed at positions where the conductive heat resistances between the first sensor and the heat generation component and between the second sensor and the heat generation component are different from each other, so that the influence due to the heat of the heat generation component on the first sensor is different from the influence due to the heat of the heat generation component on the second sensor. For this reason, when the predetermined physical quantity is measured, a difference is generated between the measurement value of the first sensor and the measurement value of the second sensor according to the heat received from the heat generation component. The disclosed technique can enhance measurement accuracy of one of the first sensor and the second sensor, which have the temperature dependence, by correcting the measurement value of the first sensor using the difference.

The disclosed technique may further have the following feature. The first sensor is disposed at a position where the conductive heat resistance between the first sensor and the heat generation component is higher than the conductive heat resistance between the second sensor and the heat generation component, and the controller corrects the measurement value of the first sensor. By having this feature, the disclosed technology can suppress the influence of the heat of the heat generation component on the first sensor, which is less affected by the heat of the heat generation component than the second sensor.

The disclosed technique may further have the following feature. The second sensor is disposed on a path through which heat is transferred from the heat generation component to the first sensor. By having this feature, the influence of the heat from the heat generation component on the second sensor is certainly larger than the influence of the heat from the heat generation component on the first sensor. For this reason, the difference between the measurement value of the first sensor and the measurement value of the second sensor becomes more significant in the case where the heat generation component generates the heat. Consequently, correction accuracy of the measurement value of the first sensor can further be enhanced when the measurement value of the first sensor and the measurement value of the second sensor are used.

The disclosed technique may further have the following feature. The first sensor and the heat generation component are disposed on a substrate, and a cut is provided on the substrate between the first sensor and the heat generation component. The conductive heat resistance between the first sensor and the heat generation component can further be increased by providing the cut in the substrate. Consequently, by having this feature, the disclosed technology can decrease the influence of the heat of the heat generation component on the first sensor as compared to the influence of the heat of the heat generation component on the second sensor.

The disclosed technique may further have the following feature. The environment sensor further includes a connection unit that connects the environment sensor to an external device in which the controller acquires a load factor relating to processing of the external device through the connection unit, and corrects the measurement value of the first sensor based on the load factor and the measurement values of the first sensor and the second sensor when the predetermined physical quantity is measured. The heat generation of the external device is increased according to the load factor relating to the processing. Consequently, by having this feature, the disclosed technology can perform the correction relating to the heat generation of the external device with respect to the measurement value of the first sensor.

The first sensor of the disclosed technique may be a temperature sensor that measures ambient temperature. By having such features, the disclosed technique can correct the measurement value of the first sensor that is the temperature sensor in consideration of the heat of the heat generation component.

An environment sensor of the present invention can suppress degradation of measurement accuracy due to heat of a heat generation component even if a sensor element has temperature dependence.

BRIEF DESCRIPTION OF THE DRAWINGS

FIG. 1B is a diagram illustrating an example of an elapsed time since a heat generation component and a calculation unit generate heat and a temperature measurement result of each of two temperature sensor elements;

FIG. 1C is a diagram illustrating an example of the elapsed time since the heat generation component and the calculation unit generate the heat and a change rate of the temperature measurement result of each of the two temperature sensor elements;

DETAILED DESCRIPTION

Hereinafter, an environment sensor according to an embodiment will be described with reference to the drawings. A configuration of the embodiment described below is an example, and the disclosed technology is not limited to the configuration of the embodiment.

<Application Example>

An application example of the disclosed technology will be described. The environment sensor according to the application example includes two temperature sensor elements, which are disposed such that conductive heat resistances between the temperature sensor elements and a heat generation component provided in the environment sensor are different from each other. The heat generation component is an element that generates heat when the element operates. Examples of the heat generation component include a large-calorific value sensor element exemplified by a gas sensor that detects a chemical substance existing in an atmosphere, an arithmetic element that performs predetermined arithmetic processing, and an element, such as a regulator that supplies voltage, which controls a power supply voltage. In addition to the heat due to the surrounding environmental temperature, the temperature sensor element receives the heat of the heat generation component provided in the sensor. For this reason, an error is generated in temperature measurement of the temperature sensor element due to an influence of the heat of the heat generation component provided in the sensor. As described above, the environment sensor of the application example has the two temperature sensor elements, which are disposed such that the conductive heat resistances between the temperature sensor elements and the heat generation component are different from each other. Because the two temperature sensor elements are different from each other in the conductive heat resistance with the heat generation component, the influence of the heat of the heat generation component provided in the environment sensor varies between the two temperature sensor elements, which results in that a difference is generated between measurement results of the temperature sensor elements. In the application example, based on the temperature measurement results of the two temperature sensor elements, the measurement result of one of the temperature sensor elements is corrected to improve measurement accuracy of one of the temperature sensors.

Figure 1A:
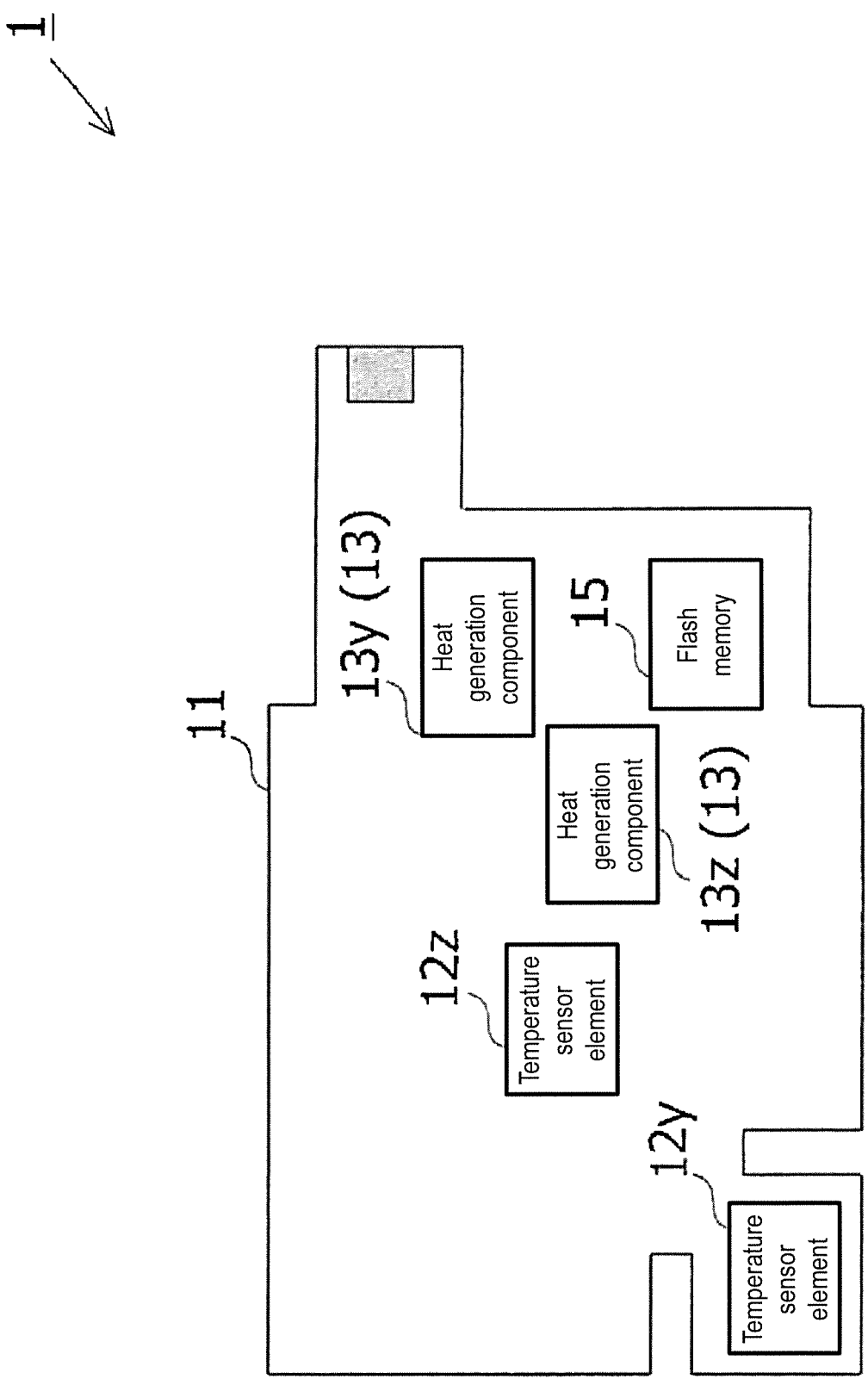
FIG. 1A is a diagram illustrating an example of a position where each element is provided on an internal substrate of an environment sensor according to an application example.

FIG. 1A is a diagram illustrating an example of a position where each element is provided on an internal substrate 11 of an environment sensor 1 of the application example. In the environment sensor 1, temperature sensor elements 12$y$, 12$z$, heat generation components 13$y$, 13$z$, and a flash memory 15 are provided on the internal substrate 11. The heat generation components 13$y$, 13$z$ are a component that generates the heat when the component operates. The temperature sensor elements 12$y$, 12$z$ are a sensor in which an output value fluctuates depending on an ambient temperature. As can be seen from FIG. 1A, the temperature sensor element 12$z$ is disposed near the heat generation components 13$y$, 13$z$, and the temperature sensor element 12$y$ is provided away from the heat generation components 13$y$, 13$z$. That is, a distance between the temperature sensor element 12$y$ and the heat generation component 13$y$ is longer than a distance between the temperature sensor element 12$z$ and the heat generation component 13$y$. The distance between the temperature sensor element 12$y$ and the heat generation component 13$z$ is longer than the distance between the temperature sensor element 12$z$ and the heat generation component 13$z$. It is considered that the conductive heat resistance of the internal substrate 11 is proportional to the distance, so that it is considered that the temperature sensor element 12$y$ is disposed at a position where the conductive heat resistance between the temperature sensor element 12$y$ and the heat generation components 13$y$, 13$z$ is higher than that between the temperature sensor element 12$z$ and the heat generation components 13$y$, 13$z$. As can be seen from FIG. 1A, the temperature sensor element 12$z$ is provided so as to be positioned between the heat generation components 13$y$, 13$z$ and the temperature sensor element 12$y$. That is, the temperature sensor element 12$z$ is provided on a heat flow path through which the heat is transferred from the heat generation components 13$y$, 13$z$ to the temperature sensor element 12$y$. For this reason, the measurement result of the temperature sensor element 12$z$ is larger than the measurement result of the temperature sensor element 12$y$ in an influence of the heat generation of the heat generation components 13$y$, 13$z$. Hereinafter, the heat generation components 13$y$, 13$z$ are collectively referred to as a heat generation component 13.

FIG. 1B is a diagram illustrating an example of an elapsed time since the heat generation component 13 generates the heat and the temperature measurement results of the temperature sensor elements 12$y$, 12$z$. FIG. 1C is a diagram illustrating an example of the elapsed time since the heat generation component 13 generates the heat and change rates of the temperature measurement results of the temperature sensor elements 12$y$, 12$z$. The change rate is a change amount per unit time, and can also be referred to as a gradient of the graph in FIG. 1B. Horizontal axes in FIGS. 1B and 10 indicate an elapsed time since the heat generation component 13 generates the heat. A vertical axis of FIG. 1B indicates the measured temperature. The vertical axis of FIG. 1B indicates an example of a difference in gradient between the graph of the temperature sensor element 12$y$ in FIG. 1B and the graph of the temperature sensor element 12$z$ in FIG. 1B. In FIGS. 1B and 1C, the temperature sensor element 12$y$ is described as a temperature sensor 1, and the temperature sensor element 12$z$ is described as a temperature sensor 2.

As can be seen from FIGS. 1B and 1C, the temperatures indicated by the output values of the temperature sensor elements 12$y$, 12$z$ rise in a predetermined period after the heat generation component 13 starts to generate the heat, and settle at a substantially constant temperature. Hereinafter, a period in which the output values of the temperature sensor elements 12$y$, 12$z$ settle after the heat generation component 13 starts to generate the heat is referred to as a temperature rising period, and a period in which the temperature becomes substantially constant is referred to as a temperature equilibrium period. That is, the temperature rising period can be said as the case where the increase in temperature per unit time exceeds a predetermined range, and the temperature equilibrium period can be said as the case where the increase in temperature per unit time falls within the predetermined range. The increase in temperature per unit time can also be said as a change amount of the temperature per unit time. By previously storing the predetermined range in the flash memory 15, an arithmetic processor such as a processor can determine whether it is the temperature rising period or the temperature equilibrium period based on the predetermined range stored in the flash memory 15 and the temperatures indicated by the output values of the temperature sensor elements 12$y$, 12$z$. Alternatively, by storing a length of the temperature rising period previously measured by experiments in the flash memory 15, the arithmetic processor such as the processor can determine whether it is the temperature rising period or the temperature equilibrium period based on the length of the temperature rising period stored in the flash memory 15. The processor is an example of a controller. The output values of the temperature sensor elements 12$y$, 12$z$ are an example of a measurement value. The temperature indicated by the output value of each of the temperature sensor elements 12$y$, 12$z$ is also an example of the measurement value.

As described above, the temperature sensor element 12$z$ is disposed at the position where the conductive heat resistance between the temperature sensor element 12$z$ and the heat generation component 13 is higher than that between the temperature sensor element 12$y$ and the heat generation component 13. For this reason, as can be seen from FIGS. 1B and 1C, when the heat generation component 13 starts to generate the heat, the temperature measurement result of the temperature sensor element 12$z$ rises more abruptly than the temperature measurement result of the temperature sensor element 12$y$. That is, a differential value obtained by differentiating the temperature measurement result of the temperature sensor element 12$z$ with respect to time is larger than a differential value obtained by differentiating the temperature measurement result of the temperature sensor element 12$y$ with respect to time. The temperature measurement result of the temperature sensor element 12$z$ is higher than that of the temperature sensor element 12$y$. That is, the temperature sensor element 12$y$ is less than the temperature sensor element 12$z$ in the influence of the heat of the heat generation component 13. Consequently, a measurement error of the temperature of the temperature sensor element 12$y$ is smaller than a measurement error of the temperature sensor element 12$z$.

As can be seen from FIG. 1B, the temperature equilibrium period is larger than the temperature rising period in the difference (described as the temperature difference in FIG. 1B) between the temperature indicated by the output value of the temperature sensor element 12$y$ and the temperature indicated by the output value of the temperature sensor element 12$z$. As can be seen from FIG. 1C, the temperature rising period is larger than the temperature equilibrium period in the gradient of the graph of the temperature sensor element 12y and the gradient of the graph of the temperature sensor element 12z. For this reason, the temperature sensor element 12y in the temperature equilibrium period is corrected based on the difference between the temperature indicated by the output value of the temperature sensor element 12y and the temperature indicated by the output value of the temperature sensor element 12z with no use of the differential value of temperature.

Figure 1D:
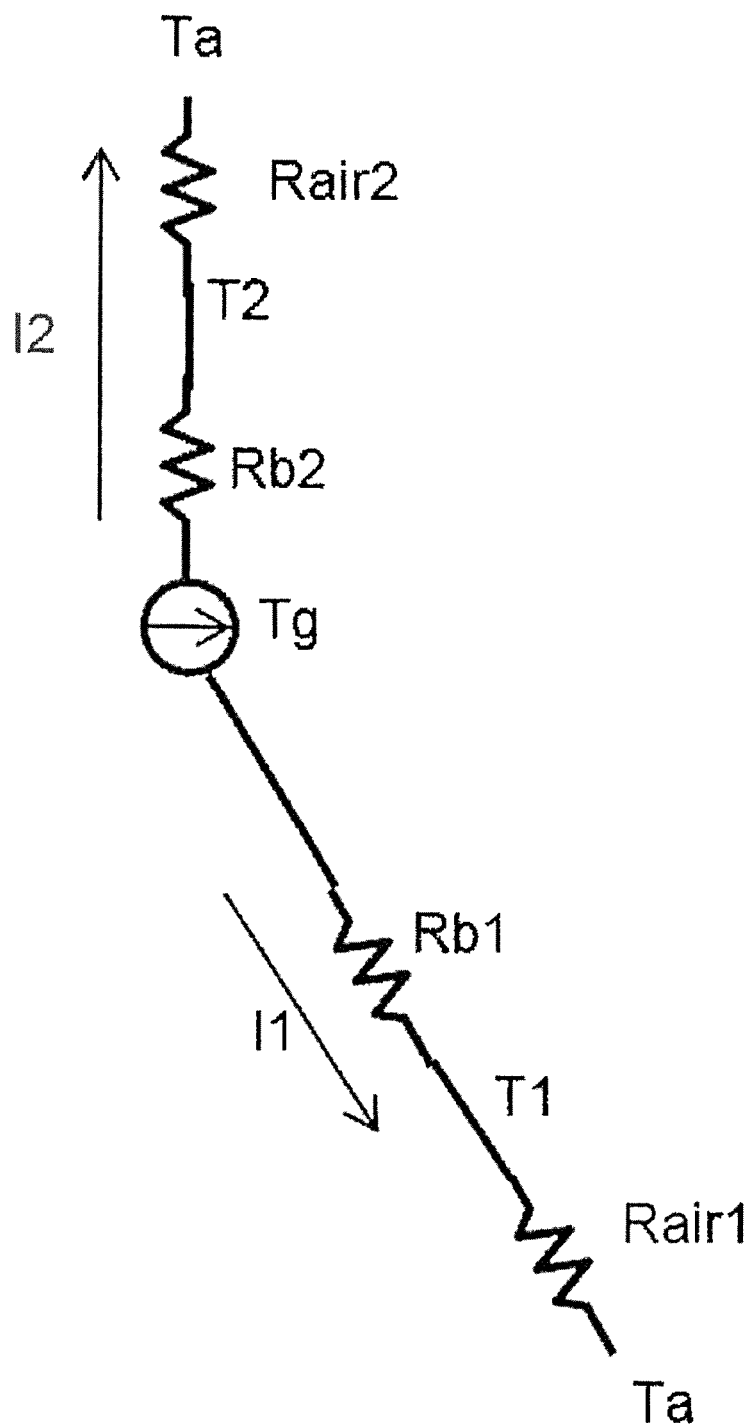
FIG. 1D is a diagram illustrating an example of a thermal equivalent circuit of the environment sensor of the application example.

The thermal equivalent circuit of the environment sensor 1 described above can be illustrated by FIG. 1D. In FIG. 1D, $T_a$ indicates the environmental temperature, $T_g$ indicates the heat generated by the heat generation component 13, $T_1$ indicates the temperature indicated by the output value of the temperature sensor element 12y, and $T_2$ indicates the temperature indicated by the output value of the temperature sensor element 12z. $R_{air1}$ indicates a heat resistance from the temperature sensor element 12y to outside air, $R_{air2}$ indicates a heat resistance from the temperature sensor element 12z to outside air, $R_{b1}$ indicates a heat resistance from the heat generation component 13 to the temperature sensor element 12y, and $R_{b2}$ indicates a heat resistance from the heat generation component 13 to the temperature sensor element 12z. 11 indicates a heat flux passing through the temperature sensor element 12y, and 12 indicates a heat flux passing through the temperature sensor element 12z.

For example, the corrected temperature of the temperature sensor element 12y can be calculated by the following equation (1).

[Equation 1]

$$T_a = T_1 - \frac{R_{air}}{R_{b1} - R_{b2} \cdot \frac{R_{b1} + R_{air\,1}}{R_{b2} + R_{air\,2}}} (T_2 - T_1) + \beta \frac{dT_1}{dt} \quad (1)$$

In equation (1), β is a coefficient determined based on heat capacity of an environment sensor 10 and the thermal conductivity from the heat generation component 13 to the temperature sensor element 12y, and $dT_1/dt$ is a differential value of temperature obtained by differentiating the temperature indicated by the output value of the temperature sensor element 12y with respect to time. For example, the heat capacity of the environment sensor 10 is a sum of the heat capacities of a casing 20, the internal substrate 11, and each element provided on the internal substrate 11. The equation (1) is an example of an equation for correcting the temperature indicated by the output value of the temperature sensor element 12y in the thermal equivalent circuit of FIG. 1D. When the heat resistance values ($R_{air1}$, $R_{air2}$, $R_{b1}$, $R_{b2}$) and the coefficient β are previously determined by experiments in the equation (1), the environmental temperature $T_a$ is calculated by the equation (1) from the temperature indicated by the output value of the temperature sensor element 12y and the differential value obtained by differentiating the temperature indicated by the output value of the temperature sensor element 12z and the temperature indicated by the output value of the temperature sensor element 12y with respect to time. As described above, the temperature equilibrium period is smaller than the temperature rising period in the differential value of the temperature. For this reason, in the equation (1), the temperature rising period is larger than the temperature equilibrium period in a contribution of the differential value of the temperature to the correction of the temperature indicated by the output value of the temperature sensor element 12y.

The equation (1) can also be rearranged like the following equation (2).

[Equation 2]

$$T_1 - T_a = \frac{R_{air}}{R_{b1} - R_{b2} \cdot \frac{R_{b1} + R_{air\,1}}{R_{b2} + R_{air\,2}}} (T_2 - T_1) + \beta \frac{dT_1}{dt} \quad (2)$$

Referring to the equation (2), when each heat resistance value ($R_{air1}$, $R_{air2}$, $R_{b1}$, $R_{b2}$) is a constant, the difference between the temperature indicated by the output value of the temperature sensor element 12y and the environmental temperature ($T_1-T_a$) is proportional to the difference ($T_2-T_1$) between the temperature indicated by the output value of the temperature sensor element 12z and the temperature indicated by the output value of the temperature sensor element 12y.

<Embodiment>

Figure 2:
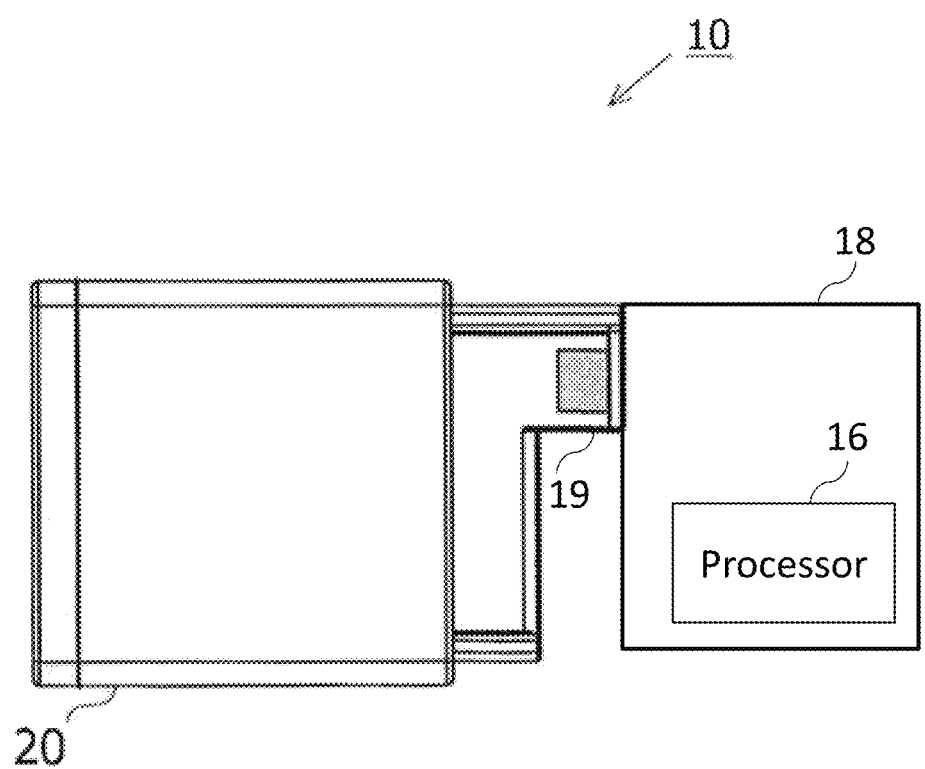
FIG. 2 is a diagram illustrating an example of an appearance of an environment sensor according to an embodiment.
Figure 3:
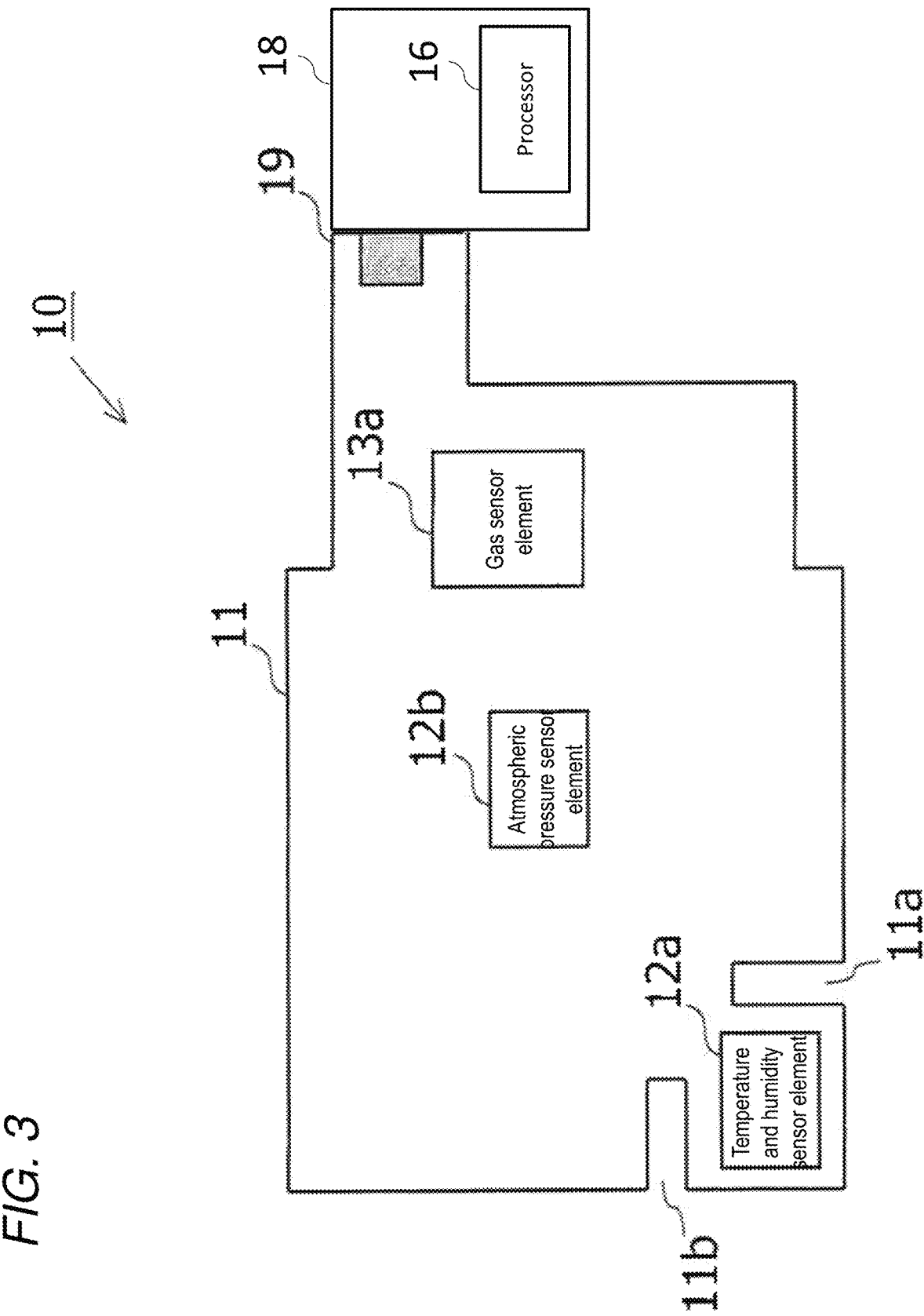
FIG. 3 is a diagram illustrating an example of an internal substrate of the environment sensor of the embodiment when the internal substrate is viewed from a front direction.
Figure 4:
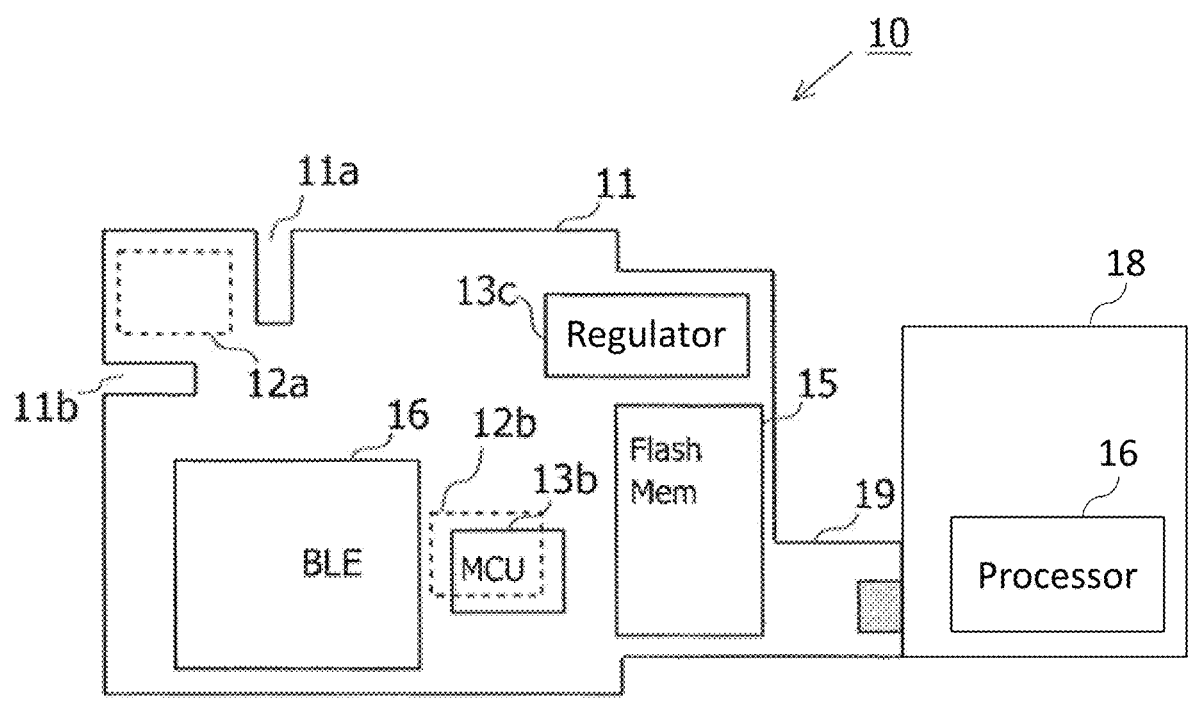
FIG. 4 is a diagram illustrating an example of the internal substrate of the environment sensor of the embodiment when the internal substrate is viewed from a back surface direction.

FIGS. 2 to 4 are diagrams illustrating an example of an environment sensor 10 according to an embodiment. The environment sensor 10 is an example of the environment sensor 1 of the application example. FIG. 2 is a diagram illustrating an example of an appearance of the environment sensor 10. The environment sensor 10 includes a casing 20 and a connection terminal 19. The connection terminal 19 is used in connection to an external device 18 exemplified by a personal computer including a processor 16. The environment sensor 10 can transmit the measurement result to, for example, the personal computer connected by the connection terminal 19. FIGS. 3 and 4 are diagrams illustrating an example of a state in which the casing 20 of the environment sensor 10 is removed to expose an internal substrate 11. FIG. 3 is a diagram illustrating an example of the internal substrate 11 of the environment sensor 10 when the internal substrate 11 is viewed from a front direction, and FIG. 4 is a diagram illustrating an example of the internal substrate 11 of the environment sensor 10 when the internal substrate 11 is viewed from a back surface direction. A temperature and humidity sensor element 12a and an atmospheric pressure sensor element 12b, which are provided on a surface in the front direction of the internal substrate 11, are indicated by a dotted line in FIG. 4.

For example, the internal substrate 11 of the environment sensor 10 is a printed circuit board. As illustrated in FIG. 3, the temperature and humidity sensor element 12a, the atmospheric pressure sensor element 12b, and a gas sensor element 13a are provided on a front side of the internal substrate 11. As illustrated in FIG. 4, a micro controller unit (MCU) 13b that performs arithmetic processing, a regulator 13c that supplies power, a flash memory 15 in which information (described as Flash Mem in FIG. 4), and a Bluetooth low energy (BLE) module 16 that controls wireless communication with an external device 18 are provided in the surface on the back side of the internal substrate 11. Slits 11a, 11b are provided around the temperature and humidity sensor element 12a. The temperature and humidity sensor element 12a, the atmospheric pressure sensor element 12b, the gas sensor element 13a, the MCU 13b, the regulator 13c, the flash memory 15, and the BLE module 16 are connected by wirings (not illustrated) having a predetermined pattern provided on the internal substrate 11. The gas sensor element 13a, the MCU 13b, and the regulator 13c have the higher heat generation due to operation as compared to other elements. For this reason, the gas sensor element 13a, the MCU 13b, and the regulator 13c are collectively also referred to as a heat generation component 13. The slits 11a, 11b are an example of a cut.

The temperature and humidity sensor element 12a is a sensor that measures temperature and humidity. The temperature and humidity sensor element 12a includes a temperature sensor element in which the output value varies according to ambient temperature and a humidity sensor element in which the output value varies according to ambient humidity. The temperature and humidity sensor element 12a is located away from the heat generation component 13 in order to suppress the influence of the heat of the heat generation component 13. For example, as illustrated in FIG. 3, the temperature and humidity sensor element 12a is provided at an end of the internal substrate 11. The temperature and humidity sensor element 12a is an example of the temperature sensor element 12y of the application example. The temperature and humidity sensor element 12a is an example of a first sensor.

The atmospheric pressure sensor element 12b is a sensor that measures an atmospheric pressure. The atmospheric pressure sensor element 12b includes an atmospheric pressure sensor that measures the atmospheric pressure and a temperature sensor that measures the temperature of the surrounding environment. Consequently, the temperature can also be obtained by the output value of the atmospheric pressure sensor element 12b. The atmospheric pressure sensor element 12b used as a temperature sensor element is an example of the temperature sensor element 12z of the application example. The atmospheric pressure sensor element 12b is provided on the heat flow path through which the heat is transferred from the heat generation component 13 to the temperature and humidity sensor element 12a. The atmospheric pressure sensor element 12b is an example of a second sensor.

The gas sensor element 13a is a sensor that detects a chemical substance existing in the surrounding atmosphere. The output value of the output of the gas sensor element 13a varies according to a concentration of the chemical substance in surrounding air. The calorific value during the operation of the gas sensor element 13a is higher than that of other sensor elements.

As described above, the measurement result is temporarily stored in the flash memory 15. A calibration table used to calibrate the measurement result and a program executed by the MCU 13b are stored in the flash memory 15. By executing the program stored in the flash memory 15, for example, the MCU 13b corrects the temperature indicated by the output value of the temperature and humidity sensor element 12a. When the MCU 13b operates, the heat is generated according to a processing load.

The environment sensor 10 includes the temperature and humidity sensor element 12a, the atmospheric pressure sensor element 12b, and the gas sensor element 13a so that the environment sensor 10 can perform the measurement of various physical quantities in the surrounding environment of the environment sensor 10. The measurement results measured by the temperature and humidity sensor element 12a, the atmospheric pressure sensor element 12b, and the gas sensor element 13a are temporarily stored in the flash memory 15. The MCU 13b performs predetermined correction processing on the measurement result stored in the flash memory 15, and outputs the corrected measurement result to an external device 18. For example, the output to the external device 18 is performed by wireless communication through the BLE 16 or wired communication through the connection terminal 19. FIGS. 2-4 depict an embodiment where the output to the external device 18 is performed by wired communication through the connection terminal 19.

The temperature measurement accuracy of the temperature and humidity sensor element 12a may be degraded due to the influence of the heat generation of the heat generation component 13. In the environment sensor 10 of the embodiment, the following configuration is adopted in order to suppress the degradation of the temperature measurement accuracy of the temperature and humidity sensor element 12a.

That is, the distance between the temperature and humidity sensor element 12a and the heat generation component 13 is increased as much as possible. For example, in the example of FIG. 3, the temperature and humidity sensor element 12a is provided at the end of the internal substrate 11, and the heat generation component 13 is provided away from the end of the internal substrate 11, thereby the distance between the temperature and humidity sensor element 12a and the heat generation component 13 is ensured. By ensuring the distance between the temperature and humidity sensor element 12a and the heat generation component 13, the conductive heat resistance between the temperature and humidity sensor element 12a and the heat generation component 13 can be increased, and the influence of the heat of the heat generation component 13 on the measurement accuracy of the temperature and humidity sensor element 12a is suppressed.

In the internal substrate 11, the slits 11a, 11b are provided between the temperature and humidity sensor element 12a and the heat generation component 13. The slits 11a, 11b are a cut provided around the temperature and humidity sensor element 12a in the internal substrate 11. The conductive heat resistance between the temperature and humidity sensor element 12a and the heat generation component 13 can further be increased by providing the slits 11a, 11b between the temperature and humidity sensor element 12a and the heat generation component 13. The influence of the heat of the heat generation component 13 on the temperature and humidity sensor element 12a is suppressed by increasing the conductive heat resistance.

In the embodiment, processing of correcting the measurement result of the temperature and humidity sensor element 12a is performed according to a heat generation state of the heat generation component 13. As described above, the output value of the atmospheric pressure sensor element 12b fluctuates also depending on ambient temperature. For this reason, the atmospheric pressure sensor element 12b can also be used as the temperature sensor element. As described above, the atmospheric pressure sensor element 12b is provided on the heat flow path through which the heat is transferred from the heat generation component 13 to the temperature and humidity sensor element 12a. The temperature and humidity sensor element 12a is provided at a position where the distance from the heat generation component 13 is increased as much as possible, and the slit 11a, 11b are provided such that the conductive heat resistance between the temperature and humidity sensor element 12a and the heat generation component 13 becomes higher. For this reason, the temperature and humidity sensor element 12a is different from the atmospheric pressure sensor element 12b in the influence on the measurement result due to the heat of the heat generation component 13. Thus, in the embodiment, the temperature indicated by the output value of the temperature and humidity sensor element 12a is corrected based on the temperature indicated by the output value of the temperature and humidity sensor element 12*a* and the temperature indicated by the output value of the atmospheric pressure sensor element 12*b*.

FIGS. 5 to 11 are a diagram illustrating an example of changes in output values of the temperature and humidity sensor element 12*a* and the atmospheric pressure sensor element 12*b* when the heat generation component 13 generates the heat. In FIGS. 5 to 11, the case where the heat generation component 13 is heated at a high temperature and the case where the heat generation component 13 is heated at a low temperature are compared to each other. The changes in output values of the temperature and humidity sensor element 12*a* and the atmospheric pressure sensor element 12*b* will be described below with reference to FIGS. 5 to 11.

Figure 5:
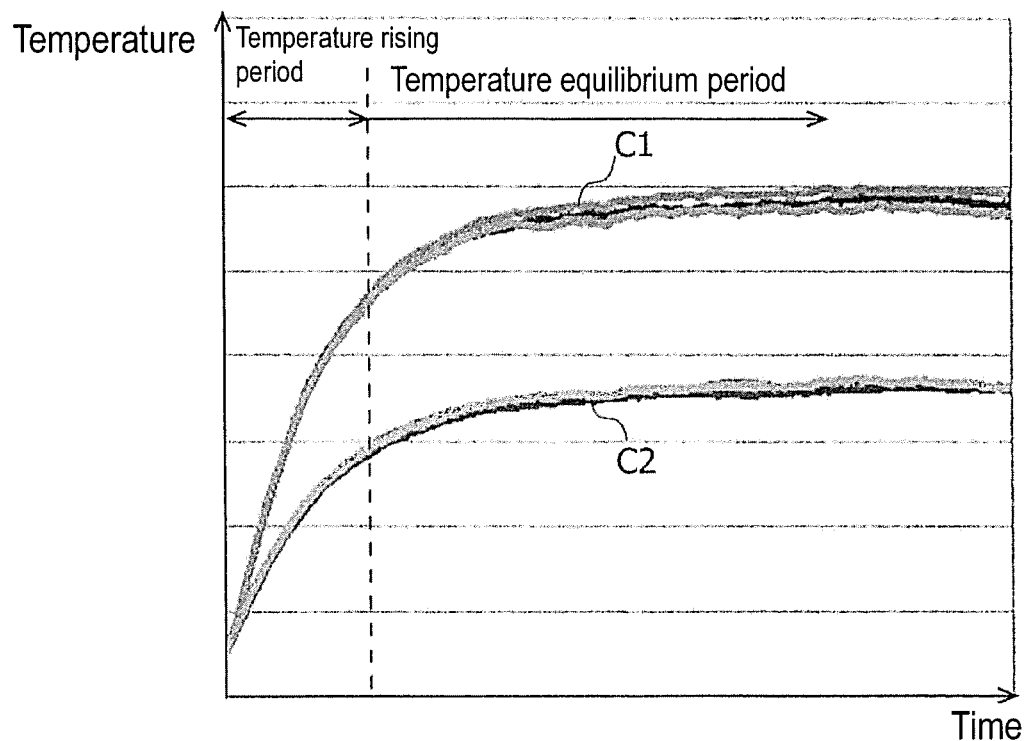
FIG. 5 is a diagram illustrating an example of temperature indicated by an output value of a temperature and humidity sensor element when the heat generation component generates the heat.

FIG. 5 is a diagram illustrating an example of temperature indicated by the output value of the temperature and humidity sensor element 12*a* when the heat generation component 13 generates the heat. In FIG. 5, the vertical axis indicates the temperature indicated by the output value of the temperature and humidity sensor element 12*a*, and the horizontal axis indicates the elapsed time since the heat generation component 13 starts to generate the heat. In FIG. 5, the change (curved line C1 in FIG. 5) in output value of the temperature and humidity sensor element 12*a* in the case where the heat generation component 13 is heated at a high temperature and the change (curved line C2 in FIG. 5) in output value of the temperature and humidity sensor element 12*a* in the case where the heat generation component 13 is heated at a lower temperature as compared to a case indicated by curved line C1. In FIG. 5, the output value of the temperature and humidity sensor element 12*a* is measured three times for each case of C1 and C2. As can be seen from FIG. 5, the temperature indicated by the output value of the temperature and humidity sensor element 12*a* rises when the heat generation component 13 starts to generate the heat, and then the temperature indicated by the output value of the temperature and humidity sensor element 12*a* is kept substantially constant. Referring to FIG. 5, the increase in temperature per unit time, namely, the change amount in the case where the heat generation component 13 is heated at a high temperature is larger than that in the case where the heat generation component 13 is heated at a low temperature. That is, the differential value of the temperature change in the case where the heat generation component 13 is heated at a high temperature is larger than that in the case where the heat generation component 13 is heated at a low temperature.

Figure 6:
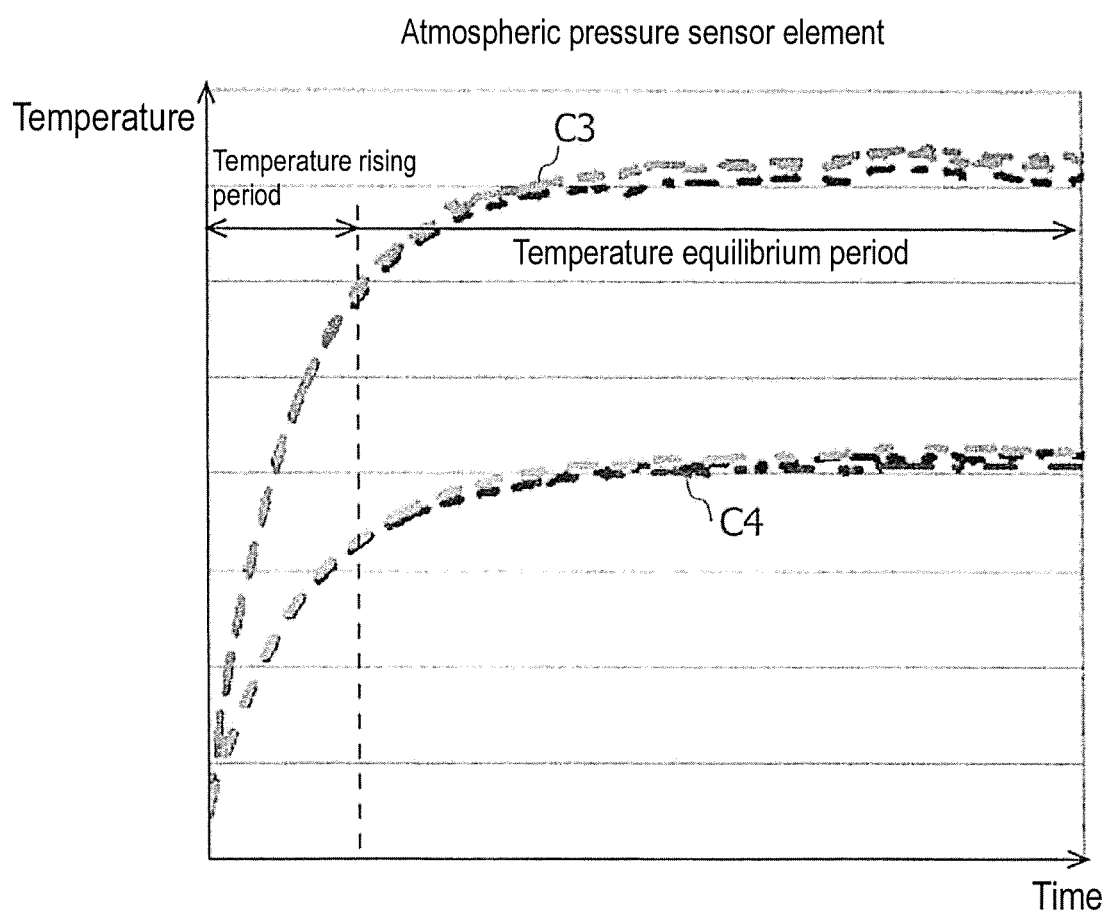
FIG. 6 is a diagram illustrating an example of temperature indicated by an output value of an atmospheric pressure sensor element when the heat generation component generates the heat.

FIG. 6 is a diagram illustrating an example of the temperature indicated by the output value of the atmospheric pressure sensor element 12*b* when the heat generation component 13 generates the heat. In FIG. 6, the vertical axis indicates the temperature indicated by the output value of the atmospheric pressure sensor element 12*b*, and the horizontal axis indicates the elapsed time since the heat generation component 13 starts to generate the heat. In FIG. 6, the change (curved line C3 in FIG. 6) in output value of the atmospheric pressure sensor element 12*b* in the case where the heat generation component 13 is heated at a high temperature and the change (curved line C4 in FIG. 6) in output value of the atmospheric pressure sensor element 12*b* in the case where the heat generation component 13 is heated at a lower temperature as compared to the case indicated by curved line C3. In FIG. 6, the output value of the atmospheric pressure sensor element 12*b* is measured three times for each case of C3 and C4. As can be seen from FIG. 6, similarly to the case illustrated in FIG. 5, the temperature indicated by the output value of the atmospheric pressure sensor element 12*b* rises when the heat generation component 13 starts to generate the heat, and then the temperature indicated by the output value of the atmospheric pressure sensor element 12*b* is kept substantially constant. The increase in temperature per unit time, namely, the change amount in the case where the heat generation component 13 is heated at a high temperature is larger than that in the case where the heat generation component 13 is heated at a low temperature. That is, the differential value of the temperature change in the case where the heat generation component 13 is heated at a high temperature is larger than that in the case where the heat generation component 13 is heated at a low temperature.

Figure 7:
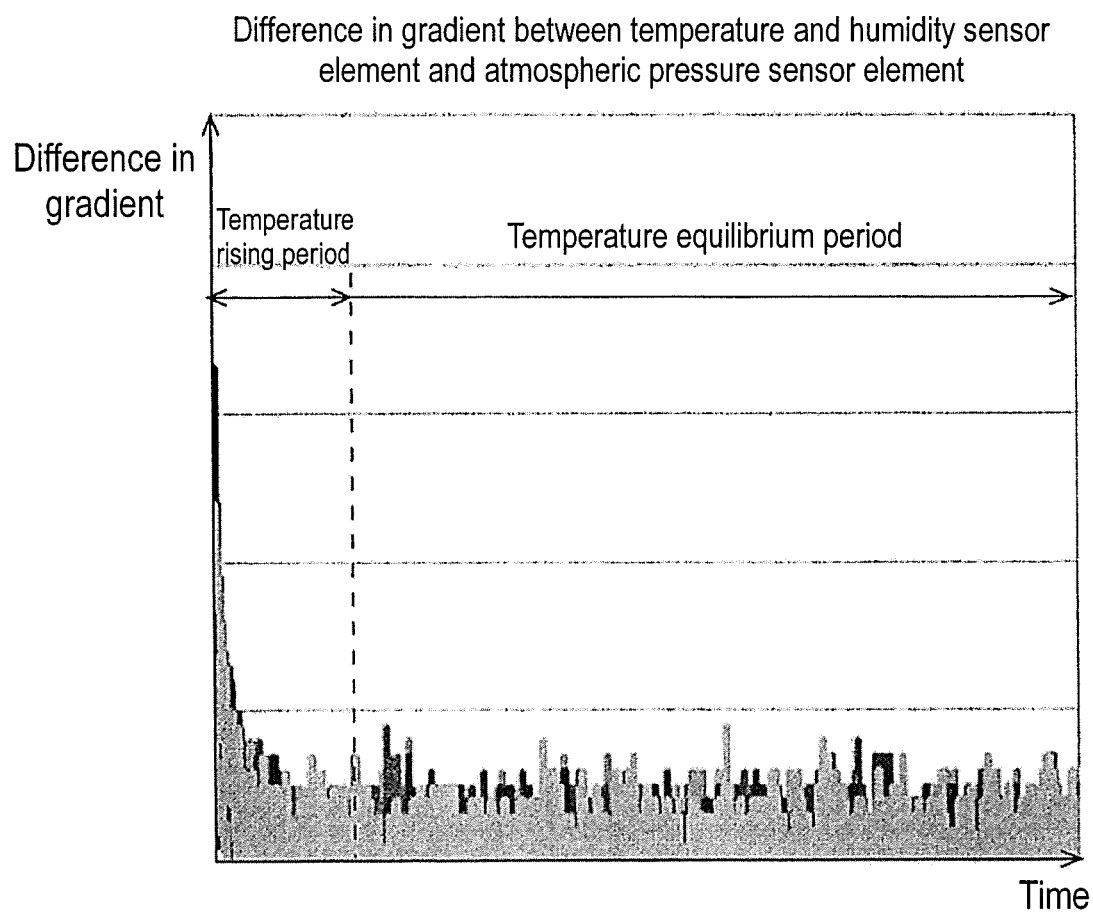
FIG. 7 is a diagram illustrating an example of a difference in gradient between a graph of the temperature and humidity sensor element in FIG. 5 and a graph of the atmospheric pressure sensor element in FIG. 6.

FIG. 7 is a diagram illustrating an example of a difference in gradient between a graph of the temperature and humidity sensor element 12*a* in FIG. 5 and a graph of the atmospheric pressure sensor element 12*b* in FIG. 6. In FIG. 7, the vertical axis indicates the difference in gradient between the graph of the temperature and humidity sensor element 12*a* in FIG. 5 and the graph of the atmospheric pressure sensor element 12*b* in FIG. 6, and the horizontal axis indicates the elapsed time since the heat generation component 13 starts to generate the heat. As can be seen from FIG. 7, the temperature rising period is larger than the temperature equilibrium period in the difference in gradient between the graph of the temperature and humidity sensor element 12*a* and the graph of the atmospheric pressure sensor element 12*b*.

Figure 8:
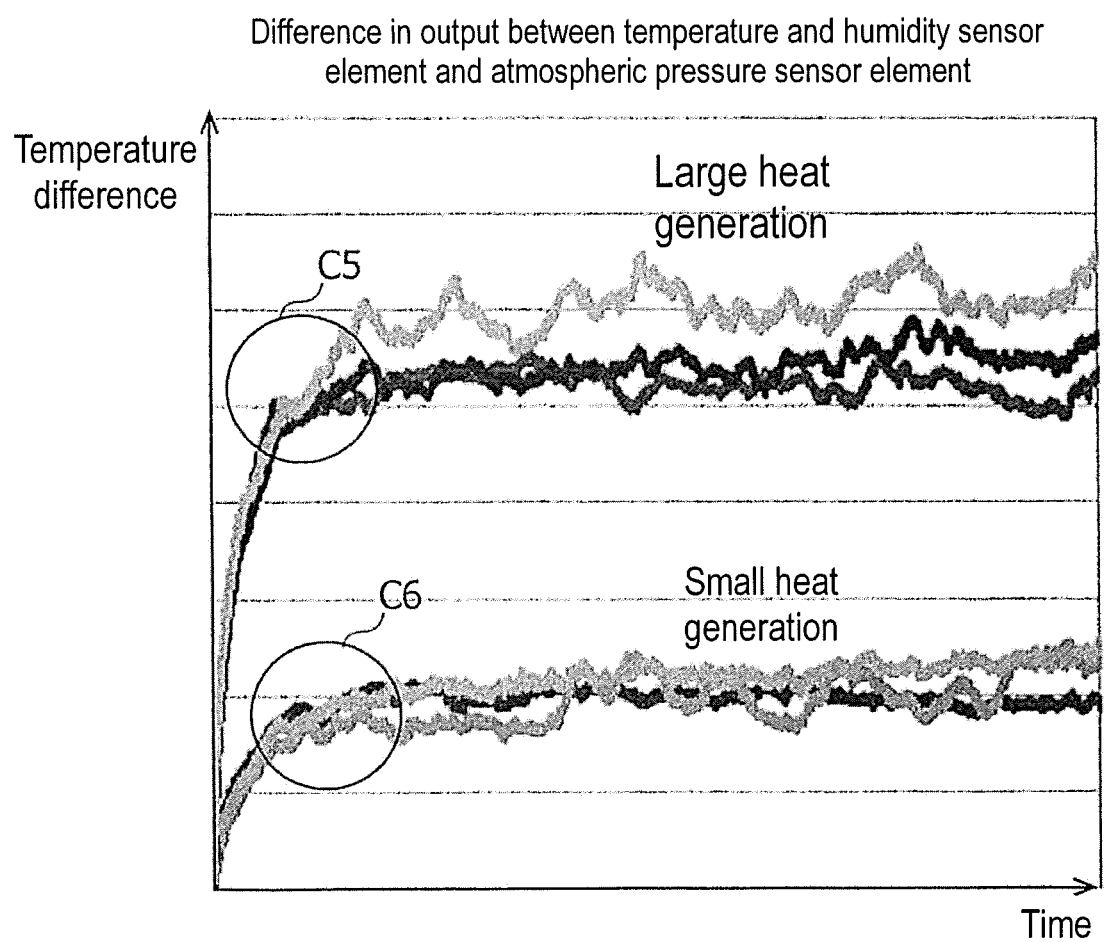
FIG. 8 is a diagram illustrating a difference between temperature indicated by the output value of the temperature and humidity sensor element in FIG. 5 and temperature indicated by the output value of the atmospheric pressure sensor element in FIG. 6.

FIG. 8 is a diagram illustrating a difference between the temperature indicated by the output value of the temperature and humidity sensor element 12*a* in FIG. 5 and the temperature indicated by the output value of the atmospheric pressure sensor element 12*b* in FIG. 6. In FIG. 8, the vertical axis indicates the difference between the temperature indicated by the output value of the temperature and humidity sensor element 12*a* and the temperature indicated by the output value of the atmospheric pressure sensor element 12*b*, and the horizontal axis indicates the elapsed time since the heat generation component 13 starts to generate the heat. FIG. 8 illustrates the difference (curved line indicated by circle C5 in FIG. 8) between the output value of the temperature and humidity sensor element 12*a* and the output value of the atmospheric pressure sensor element 12*b* in the case where the heat generation component 13 is heated at a high temperature and the difference (curved line indicated by circle C6 in FIG. 8) between the output value of the temperature and humidity sensor element 12*a* and the output value of the atmospheric pressure sensor element 12*b* in the case where the heat generation component 13 is heated at a lower temperature as compared to the case indicated by C5. As can be seen from FIG. 8, the difference between the output value of the temperature and humidity sensor element 12*a* and the output value of the atmospheric pressure sensor element 12*b* in the case where the heat generation component 13 is heated at a high temperature is larger than that in the case where the heat generation component 13 is heated at a low temperature. The difference between the output value of the temperature and humidity sensor element 12*a* and the output value of the atmospheric pressure sensor element 12*b* in the temperature equilibrium period is larger than that in the temperature rising period.

Figure 9:
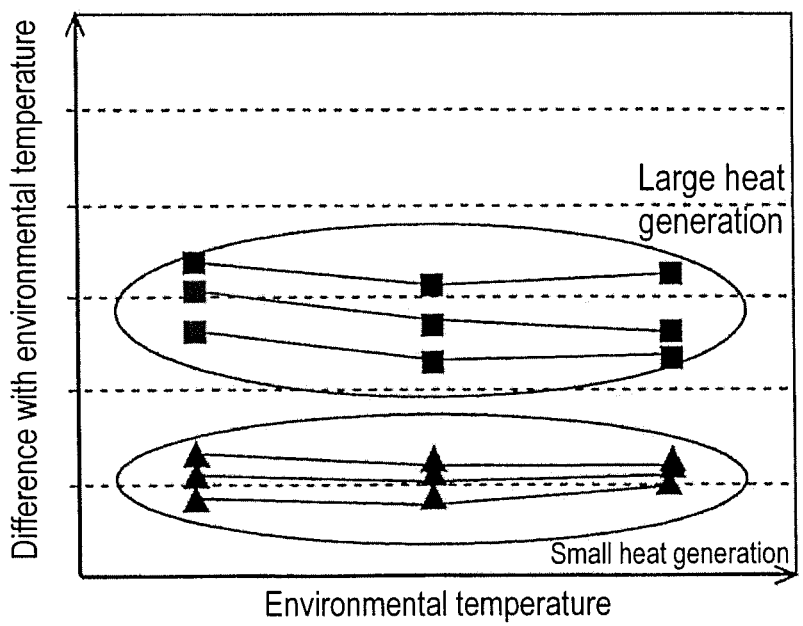
FIG. 9 is a diagram illustrating an example of a difference between an environmental temperature set by a measurement standard and the temperature indicated by the output value output from the temperature and humidity sensor element.
Figure 10:
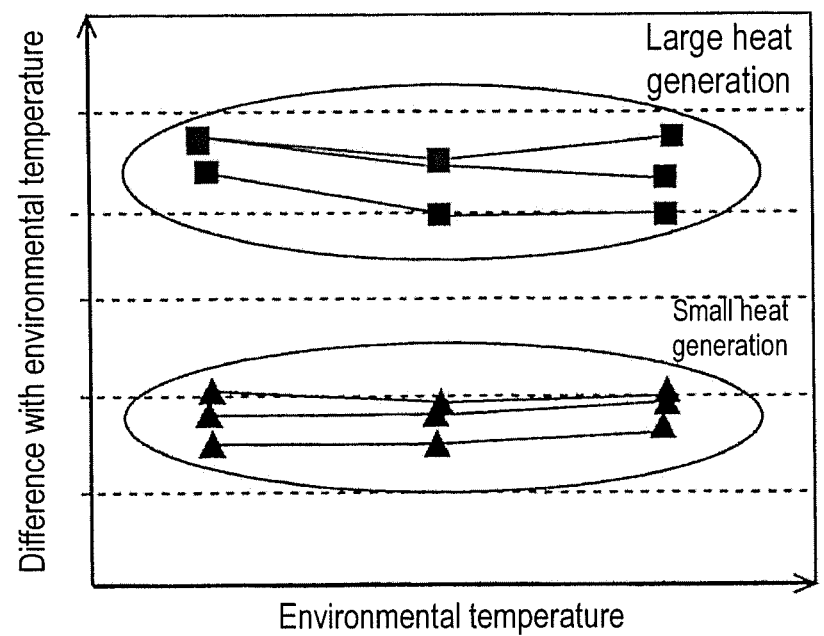
FIG. 10 is a diagram illustrating an example of a difference between the environmental temperature set by the measurement standard and the temperature indicated by the output value output from the atmospheric pressure sensor element.
Figure 11:
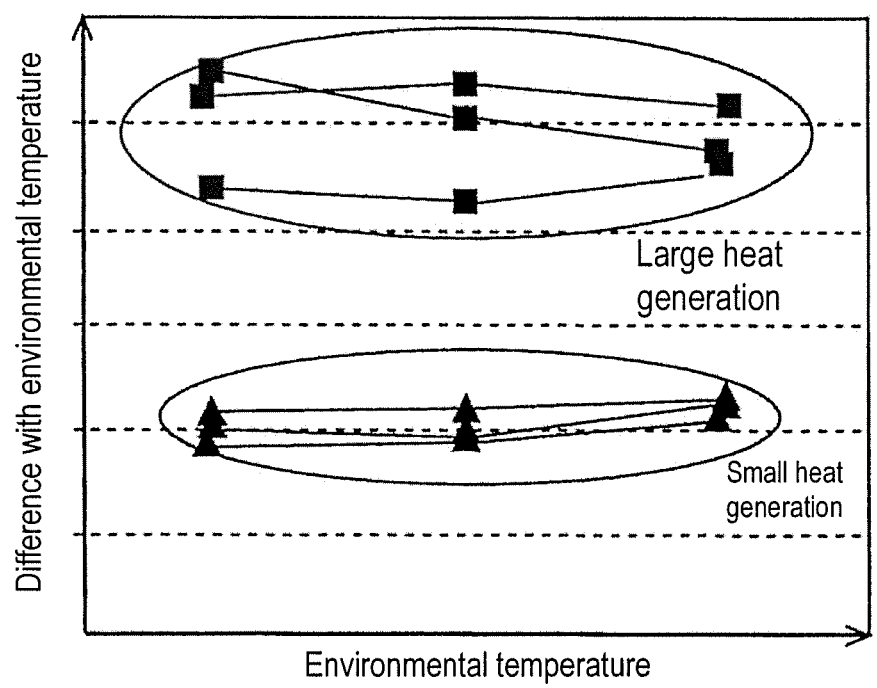
FIG. 11 is a diagram illustrating a difference between the temperature indicated by the output value of the temperature and humidity sensor element and the temperature indicated by the output value of the atmospheric pressure sensor element.

FIGS. 9 to 11 illustrate the temperatures indicated by the output values of the temperature and humidity sensor element 12*a* and the atmospheric pressure sensor element 12*b* in the temperature equilibrium period. FIG. 9 is a diagram illustrating an example of a difference between the environmental temperature set by a measurement standard and the temperature indicated by the output value output from the temperature and humidity sensor element 12a. The measurement standard is formed into, for example, a box shape, and the inside of the box can be set to a predetermined temperature. In FIG. 9, the environment sensor 10 is installed in the measurement standard, and the difference between the environmental temperature set by the measurement standard and the temperature indicated by the output value of the temperature and humidity sensor element 12a is illustrated. In other words, FIG. 9 illustrates a measurement error of the temperature and humidity sensor element 12a. In FIG. 9, the horizontal axis indicates the environmental temperature set by the measurement standard, and the vertical axis indicates the difference between the temperature indicated by the output value of the temperature and humidity sensor element 12a and the environmental temperature. FIG. 9 illustrates the case where the heat generation component is heated at a high temperature (large heat generation in FIG. 9) and the case where the heat generation component is heated at a low temperature (small heat generation in FIG. 9), and the measurement is performed three times for each of the case of the large heat generation and the case of the small heat generation. As can be seen from FIG. 9, the error of the temperature and humidity sensor element 12a in the case where the heat generation component 13 is heated at a high temperature is larger than that in the case where the heat generation component 13 is heated at a low temperature. The influence of the environmental temperature on the error of the temperature and humidity sensor element 12a is smaller than the influence due to the temperature at which the heat generation component generates the heat.

FIG. 10 is a diagram illustrating an example of the difference between the environmental temperature set by the measurement standard and the temperature indicated by the output value output from the atmospheric pressure sensor element 12b. In FIG. 10, the environment sensor 10 is installed in the measurement standard, and the difference between the environmental temperature set by the measurement standard and the temperature indicated by the output value of the atmospheric pressure sensor element 12b is illustrated. In other words, FIG. 10 illustrates the measurement error of the atmospheric pressure sensor element 12b. Because the vertical axis and the horizontal axis in FIG. 10 are similar to those in FIG. 9, the description will be omitted. As can be seen from FIG. 10, similarly to the temperature and humidity sensor element 12a in FIG. 9, the error of the atmospheric pressure sensor element 12b in the case where the heat generation component is heated at a high temperature is larger than that in the case where the heat generation component is heated at a low temperature. The influence of the environmental temperature on the error of the atmospheric pressure sensor element 12b is smaller than the influence due to the heat of the heat generation component.

FIG. 11 is a diagram illustrating a difference between the temperature indicated by the output value of the temperature and humidity sensor element 12a and the temperature indicated by the output value of the atmospheric pressure sensor element 12b. In the measurement of FIG. 11, the environment sensor 10 is installed in the measurement standard, and the difference between the temperature indicated by the output value of the temperature and humidity sensor element 12a and the temperature indicated by the output value of the atmospheric pressure sensor element 12b is recorded while the environmental temperature of the measurement standard is changed. Even in the measurement of FIG. 11, similarly to the measurements in FIGS. 9 and 10, the measurement is performed three times for each of the case of the large heat generation and the case of the small heat generation. As can be seen from FIG. 11, the difference between the temperature indicated by the output value of the temperature and humidity sensor element 12a and the temperature indicated by the output value of the atmospheric pressure sensor element 12b in the case where the heat generation component is heated at a high temperature is larger than that in the case where the heat generation component is heated at a low temperature.

As can be seen from FIGS. 5 to 11, the difference in gradient between the graph of the temperature and humidity sensor element 12a and the graph of the atmospheric pressure sensor element 12b in the temperature rising period is larger than that in the temperature equilibrium period. In other words, the difference between the differential value of the temperature indicated by the output value of the temperature and humidity sensor element 12a and the differential value of the temperature indicated by the output value of the atmospheric pressure sensor element 12b in the temperature rising period is larger than that in the temperature equilibrium period. It is also found that a difference is generated between the temperature indicated by the output value of the temperature and humidity sensor element 12a and the temperature indicated by the output value of the atmospheric pressure sensor element 12b in both the temperature rising period and the temperature equilibrium period. The influence of the environmental temperature is smaller as compared to the influence due to the temperature at which the heat generation component generates the heat, so that the environmental temperature need not be considered in correcting the temperature indicated by the output value of the temperature and humidity sensor element 12a.

Figure 12:
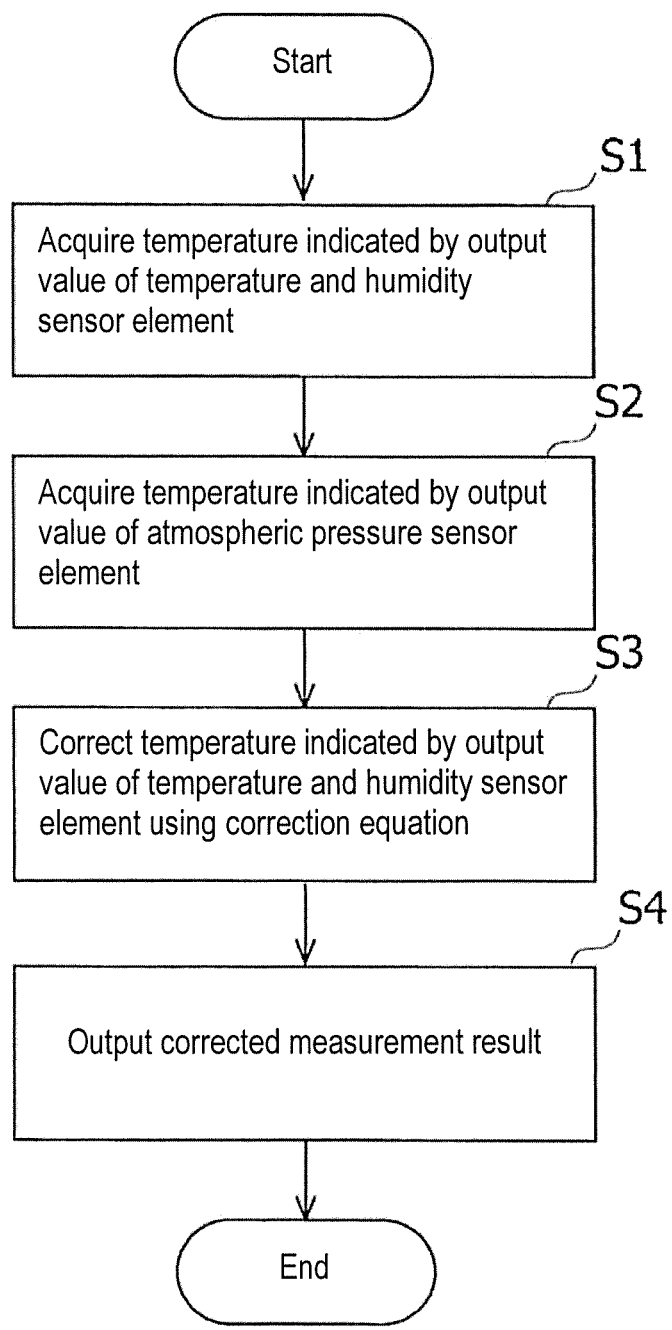
FIG. 12 is a flowchart illustrating an example of processing of correcting a measurement result of the temperature and humidity sensor element of the embodiment.

FIG. 12 is a flowchart illustrating an example of processing of correcting the measurement result of the temperature and humidity sensor element 12a of the embodiment. For example, the MCU 13b executes the program stored in the flash memory 15, whereby performing the processing in FIG. 12. In this case, for example, each resistance value ($R_{air1}$, $R_{air2}$, $R_{b1}$, $R_{b2}$ in FIG. 1D) previously confirmed by experiments is stored in the flash memory 15. An example of the processing of correcting the measurement result of the temperature and humidity sensor element 12a of the embodiment will be described below with reference to FIG. 12.

In S1, the MCU 13b acquires the temperature indicated by the output value of the temperature and humidity sensor element 12a. In S2, the MCU 13b acquires the temperature indicated by the output value of the atmospheric pressure sensor element 12b. In S3, the MCU 13b reads each resistance value ($R_{air1}$, $R_{air2}$, $R_{b1}$, $R_{b2}$ in FIG. 1D) from the flash memory 15. The MCU 13b corrects the temperature indicated by the output value of the temperature and humidity sensor element 12a by substituting the temperatures acquired in S1 and S2 and each resistance value read from the flash memory 15 into the above equation (1). In S4, the MCU 13b outputs the corrected measurement result.

In the embodiment, the temperature and humidity sensor element 12a and the atmospheric pressure sensor element 12b are disposed such that the conductive heat resistances between the temperature and humidity sensor element 12a and the heat generation component 13 and between the atmospheric pressure sensor element 12b and the heat generation component 13 are different from each other. For this reason, as illustrated in FIGS. 5 to 11, the difference is generated between the influence of the heat generation of the heat generation component 13 on the output value of the temperature and humidity sensor element 12a and the influence on the output value of the atmospheric pressure sensor element 12b. In the embodiment, the temperature indicated by the output value of the temperature and humidity sensor element 12a is corrected using the difference. Thus, in the embodiment, the measurement accuracy of the temperature and humidity sensor element 12a can be enhanced. In the embodiment, the atmospheric pressure sensor element 12b is not an element added to correct the temperature and humidity sensor element 12a, so that the element needs not to be added to the environment sensor 10 in order to enhance the measurement accuracy of the temperature and humidity sensor element 12a.

In the embodiment, the atmospheric pressure sensor element 12b is provided on the heat flow path from the heat generation component 13 to the temperature and humidity sensor element 12a. That is, the atmospheric pressure sensor element 12b is provided on the heat flow path through which the heat is transferred from the heat generation component 13 to the temperature and humidity sensor element 12a. For this reason, the influence of the heat from the heat generation component 13 on the atmospheric pressure sensor element 12b is certainly larger than the influence of the heat from the heat generation component 13 on the temperature and humidity sensor element 12a. For this reason, the difference between the temperature indicated by the output value of the atmospheric pressure sensor element 12b and the temperature indicated by the output value of the temperature and humidity sensor element 12a becomes more significant in the case where the heat generation component 13 generates the heat. For this reason, the correction accuracy of the temperature indicated by the output value of the temperature and humidity sensor element 12a in which the temperature indicated by the output value of the temperature and humidity sensor element 12a and the temperature indicated by the output value of the atmospheric pressure sensor element 12b are used can be enhanced.

In the embodiment, the slits 11a, 11b are provided between the temperature and humidity sensor element 12a and the heat generation component 13. The conductive heat resistance between the temperature and humidity sensor element 12a and the heat generation component 13 can further be increased by providing the slits 11a, 11b. The influence of the heat of the heat generation component 13 on the temperature and humidity sensor element 12a is suppressed by increasing the conductive heat resistance. As a result, the measurement accuracy of the temperature and humidity sensor element 12a can be enhanced.

In the embodiment, when the temperature indicated by the output value of the temperature and humidity sensor element 12a and the temperature indicated by the output value of the atmospheric pressure sensor element 12b are acquired, the temperature indicated by the output value of the temperature and humidity sensor element 12a can be corrected using the equation (1). That is, in the embodiment, the measurement result of the temperature and humidity sensor element 12a can suitably be corrected.

In the embodiment, the temperature and humidity sensor element 12a and the atmospheric pressure sensor element 12b, in which the output values fluctuate depending on temperature, are disposed at different positions. Thus, the outline of the temperature distribution in the environment sensor 10 can be grasped by the output values of the temperature and humidity sensor element 12a and the atmospheric pressure sensor element 12b.

<Modifications>

As illustrated in FIG. 2, the environment sensor 10 of the embodiment includes the connection terminal 19, and can be connected to the external device 18 such as the personal computer by the connection terminal 19. For this reason, when the external device 18 generates the heat, the heat is transferred to the environment sensor 10 through the connection terminal 19. There is a possibility that the measurement accuracy of the temperature and humidity sensor element 12a is degraded by the heat from the external device 18. In the external device 18, it is considered that the heat generation is increased with increasing load factor relating to the processing of the external device 18. For example, the load factor relating to the processing is an activity ratio of the arithmetic processing device installed in the external device 18. For example, a correspondence relationship between the load factor relating to the processing of the external device 18 and the correction value is previously checked by experiments, and stored in the flash memory 15. The MCU 13b may acquire the load factor relating to the processing of external governance through the connection terminal 19, and correct the temperature indicated by the output value of the temperature and humidity sensor element 12a based on the acquired load factor, the correspondence relationship stored in the flash memory 15, the temperature indicated by the output value of the temperature and humidity sensor element 12a, and the temperature indicated by the output value of the atmospheric pressure sensor element 12b. The connection terminal 19 is an example of a connection unit.

In the embodiment, the temperature and humidity sensor element 12a is corrected using the temperature indicated by the output value of the temperature and humidity sensor element 12a and the temperature indicated by the output value of the atmospheric pressure sensor element 12b. However, the technique described in the embodiment is not limited to the correction of the temperature and humidity sensor element 12a. For example, the output value of the atmospheric pressure sensor element 12b may be corrected using the temperature indicated by the output value of the temperature and humidity sensor element 12a and the temperature indicated by the output value of the atmospheric pressure sensor element 12b. As described above, the output value of the atmospheric pressure sensor element 12b fluctuates also depending on the ambient temperature, so that the measurement error of the atmospheric pressure sensor element 12b due to the ambient temperature can be suppressed by correcting the output value of the atmospheric pressure sensor element 12b.

Although the temperature indicated by the output value of the temperature and humidity sensor element 12a is corrected using the output values of the temperature and humidity sensor element 12a and the atmospheric pressure sensor element 12b in the embodiment, the output value of the element other than the temperature and humidity sensor element 12a may be corrected. For example, the environment sensor 10 has a plurality of sensors each of which has a temperature characteristic in which the output value fluctuates depending on the temperature, and the output value of one of the plurality of sensors may be corrected using the output values of the plurality of sensors.

The environment sensor 10 may further store information on the case that the heat generation component 13 is heated at a high temperature and the case where the heat generation component 13 is heated at low temperature in the flash memory 15 as illustrated in FIGS. 5 to 11. For example, the case where the heat generation component 13 is heated at a high temperature is the case where an abnormal operation is generated due to some sort of event to heat the heat generation component 13 at a high temperature, and the case where the heat generation component 13 is heated at a low temperature is the case where the heat generation component 13 operates normally. The MCU 13b can also detect that any of the heat generation components 13 performs the abnormal operation based on the output values of the temperature and humidity sensor element 12a and the atmospheric pressure sensor element 12b and the information stored in the flash memory 15.

Figure 13:
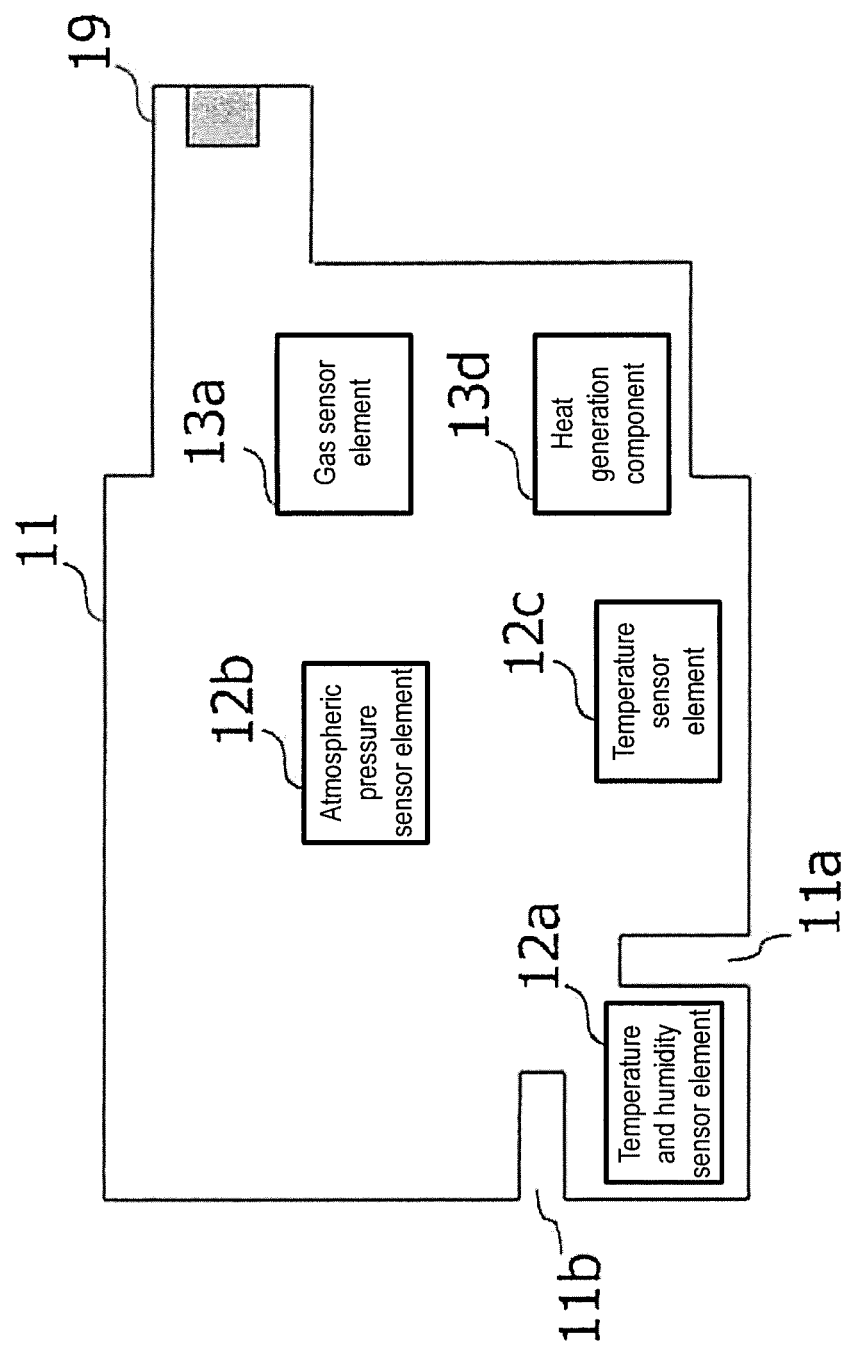
FIG. 13 is a first diagram illustrating an example of a position where each element is provided on an internal substrate of an environment sensor according to a modification.
Figure 14:
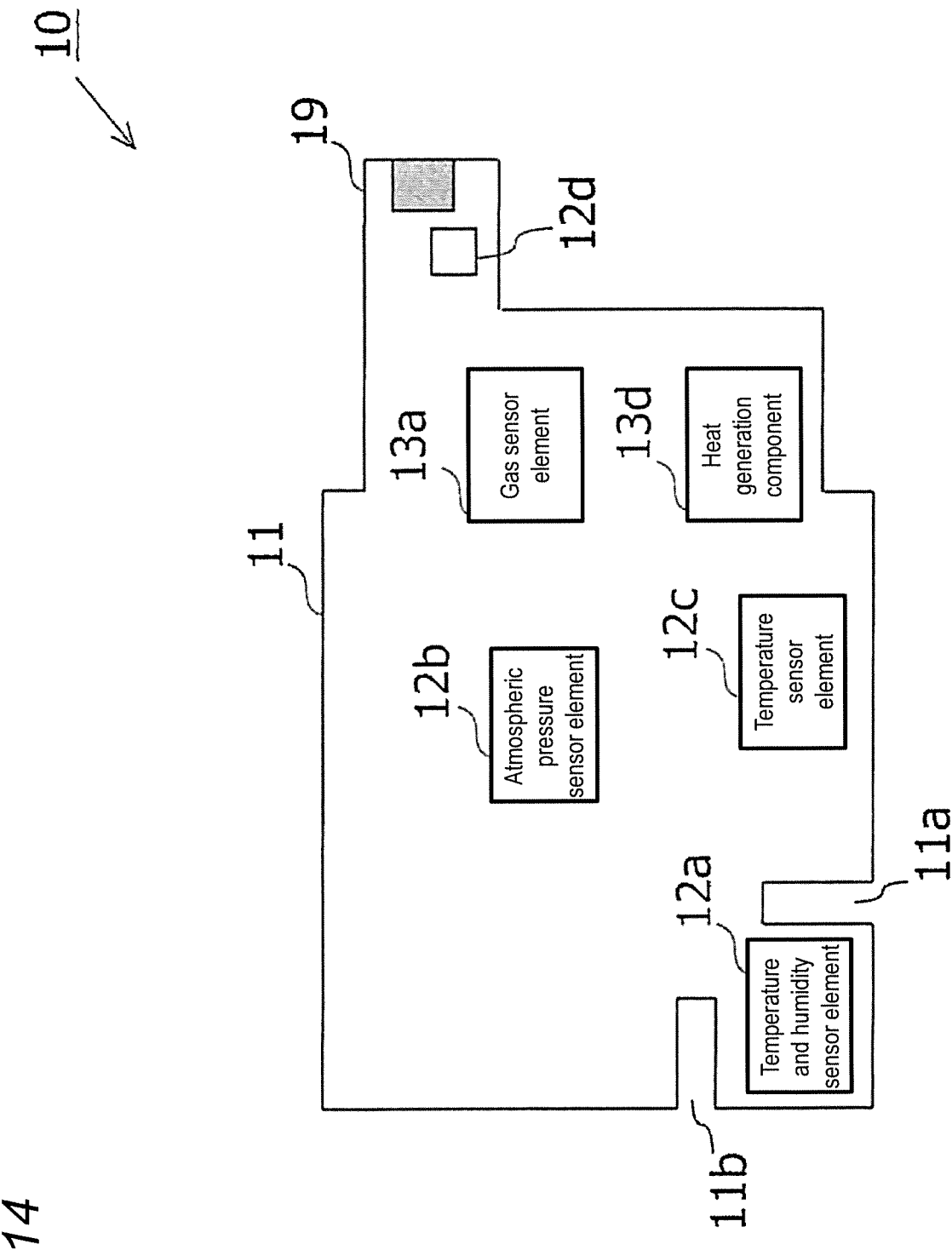
FIG. 14 is a second diagram illustrating an example of a position at which each element is provided on an internal substrate of an environment sensor according to another modification.

As illustrated in FIG. 13, in the environment sensor 10, a temperature sensor element may be disposed near each of the heat generation components 13. In FIG. 13, the atmospheric pressure sensor element 12b is disposed near the gas sensor element 13a, and a temperature sensor element 12c is disposed near a heat generation component 13d. As illustrated in FIG. 14, in the environment sensor 10, a temperature sensor element 12d may be disposed near the connection terminal 19. By adopting the configuration in FIG. 13 or 14, the information about the heat generation of the heat generation component 13 or the external device such as the personal computer connected to the connection terminal 19 can be acquired with higher accuracy, and the acquired information can be used to correct the temperature indicated by the output value of the temperature and humidity sensor element 12a.

The embodiment and modifications disclosed above can be combined.

<<Computer-Readable Recording Medium>>

An information processing program causing a computer, other machine, or device (hereinafter, referred to as a computer or the like) to implement any one of the above functions can be recorded on a recording medium readable by the computer or the like. The function can be provided by causing the computer or the like to read and execute the program of the recording medium.

As used herein, the recording medium readable by the computer or the like means a recording medium, which can accumulate the information such as data and the program by electrical, magnetic, optical, mechanical, or chemical action and can be read from the computer or the like. Examples of the recording mediums detachable from the computer or the like include a flexible disk, a magneto-optical disk, a compact disc read only memory (CD-ROM), a compact disc-recordable (CD-R), a compact disc-rewritable (CD-RW), a digital versatile disc (DVD), a Blu-ray disc (BD), a digital audio tape (DAT), an 8-mm tape, and a memory card such as a flash memory. A hard disk and a ROM can also be cited as an example of the recording medium fixed to the computer or the like.

The invention claimed is:

1. An environment sensor comprising:
a heat generation component;
a first sensor and a second sensor disposed such that conductive heat resistances between the first sensor and the heat generation component and between the second sensor and the heat generation component are different from each other;
a controller;
a memory storing a threshold value; and
a connection unit that connects the environment sensor to an external device,
wherein the first sensor and the second sensor are capable of measuring a predetermined physical quantity,
wherein the first sensor and the second sensor obtain a measurement value from the predetermined physical quantity,
wherein the measurement value fluctuates depending on ambient temperature,
wherein the controller is configured to correct the measurement value of one of the first sensor and the second sensor based on the measurement value of the first sensor and the measurement value of the second sensor when the predetermined physical quantity is measured,
wherein correcting the measurement value of one of the first sensor and the second sensor includes correcting the measurement value of one of the first sensor and the second sensor based on a difference between the measurement value of the first sensor and the measurement value of the second sensor when an increase in the measurement value of the first sensor per unit time and an increase in the measurement value of the second sensor per unit time are less than the threshold value, and
wherein the controller acquires a load factor relating to processing of the external device through the connection unit, and corrects the measurement value of the first sensor based on the load factor acquired from the external device through the connection unit and the measurement values of the first sensor and the second sensor when the predetermined physical quantity is measured.

2. The environment sensor according to claim 1,
wherein the first sensor is disposed at a position where the conductive heat resistance between the first sensor and the heat generation component is higher than the conductive heat resistance between the second sensor and the heat generation component, and
wherein the controller corrects the measurement value of the first sensor.

3. The environment sensor according to claim 2, wherein the second sensor is disposed on a path through which heat is transferred from the heat generation component to the first sensor.

4. The environment sensor according to claim 2, wherein the first sensor and the heat generation component are disposed on a substrate, and a cut is provided on the substrate between the first sensor and the heat generation component.

5. The environment sensor according to claim 1, wherein the first sensor is a temperature sensor.

6. The environment sensor according to claim 3, wherein the first sensor and the heat generation component are disposed on a substrate, and a cut is provided on the substrate between the first sensor and the heat generation component.

7. The environment sensor according to claim 2, wherein the first sensor is a temperature sensor.

8. The environment sensor according to claim 3, wherein the first sensor is a temperature sensor.

9. The environment sensor according to claim 4, wherein the first sensor is a temperature sensor.

* * * * *